United States Patent [19]

Suzuki et al.

[11] 4,257,682

[45] Mar. 24, 1981

[54] LIQUID CRYSTAL COLOR DISPLAY CELL

[75] Inventors: Takaharu Suzuki, Tokyo; Hiroshi Shimizu, Kawagoe, both of Japan

[73] Assignee: Citizen Watch Co., Ltd., Tokyo, Japan

[21] Appl. No.: 879,519

[22] Filed: Feb. 21, 1978

[30] Foreign Application Priority Data

Mar. 18, 1977 [JP] Japan .................................. 52/30025

[51] Int. Cl.³ ............................................. G02F 1/133
[52] U.S. Cl. .................................... 350/349; 350/340
[58] Field of Search ................................. 350/349, 340

[56] References Cited

U.S. PATENT DOCUMENTS

| | | | |
|---|---|---|---|
| 3,551,026 | 12/1970 | Heilmeier | 350/349 |
| 3,787,110 | 1/1974 | Berreman et al. | 350/341 |
| 3,833,287 | 9/1974 | Taylor et al. | 350/349 |
| 3,865,469 | 2/1975 | Asai et al. | 350/349 |
| 3,914,022 | 10/1975 | Kashnow | 350/340 |
| 4,030,997 | 6/1977 | Miller et al. | 358/340 |

*Primary Examiner*—Edward S. Bauer
*Attorney, Agent, or Firm*—Sherman & Shalloway

[57] ABSTRACT

A liquid crystal color display cell utilizing a Guest-host effect and capable of displaying at least two colors whose color phases are different from each other. The cell comprises a liquid crystal layer sandwiched between a pair of opposed substrates and composed of liquid crystal molecules inclined at an angle within a range between 60° and 90° with respect to each of the substrates. The inclination of the liquid crystal molecules is aligned in one direction and the liquid crystal molecules have a twisted construction between the substrates.

5 Claims, 11 Drawing Figures

FIG. 1
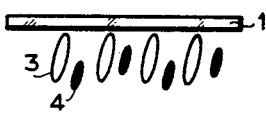
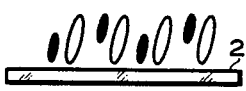
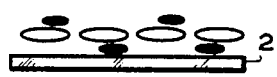
FIG. 2   FIG. 3
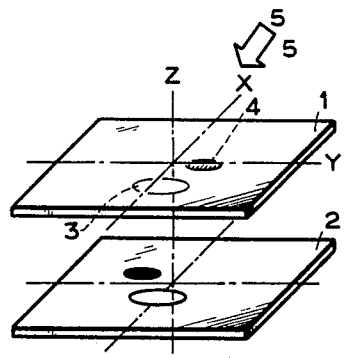
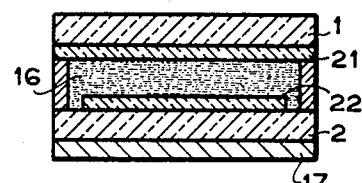
FIG. 4   FIG. 5
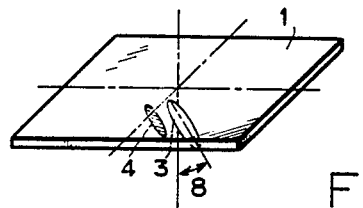
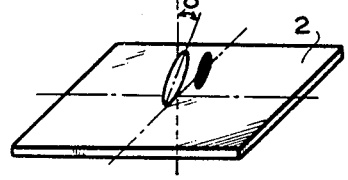
FIG. 6

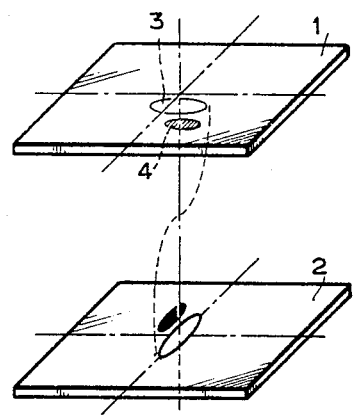
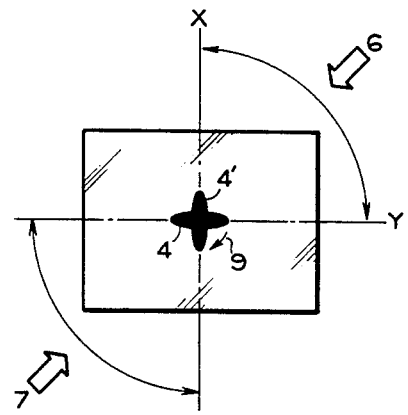
FIG. 7    FIG. 8
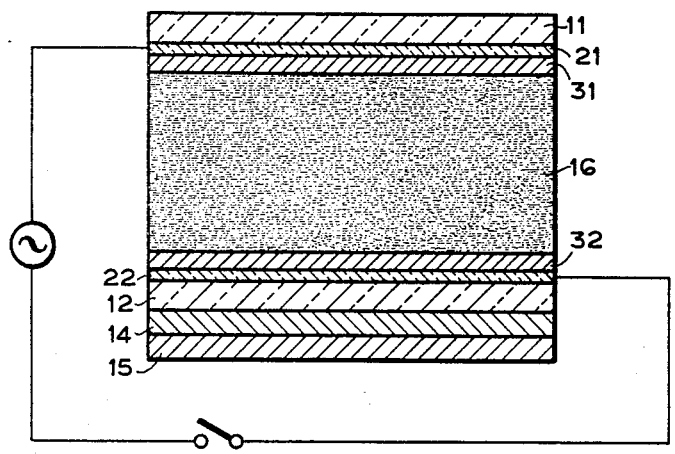
FIG. 9
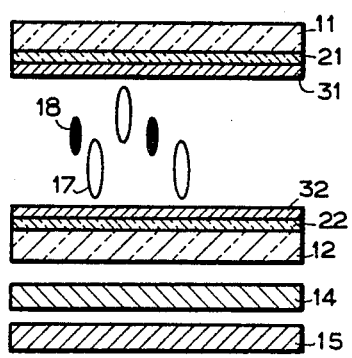    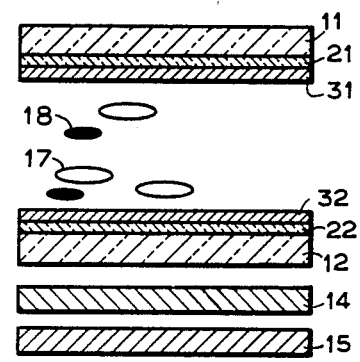
FIG. 10    FIG. 11

LIQUID CRYSTAL COLOR DISPLAY CELL

BACKGROUND OF THE INVENTION

1. Field of the Invention

This invention relates to liquid crystal color display cells and more particularly to a nematic type liquid crystal color display cell utilizing a Guest-host effect.

2. Description of the Prior Art

As a color display process which makes use of a nematic liquid crystal, both a process utilizing an Electrically controlled birefringence effect (ECB effect) or Deformation of vertical aligned phases effect (DAP effect) and a process utilizing the Guest-host effect have heretofore been well known.

In a liquid crystal color display cell utilizing the ECB effect, if the liquid crystal has a positive dielectric anisotropic property, the liquid crystal is sandwiched between two substrates which are treated such that a long axis of a liquid crystal molecule is homogeneously aligned with a horizontal direction between these two substrates. If the liquid crystal has a negative dielectric anisotropic property, the liquid crystal is sandwiched between two substrates which are treated such that the long axis of the liquid crystal molecule is homeotropically aligned with a vertical direction between these two substrates. A voltage is applied to the liquid crystal which is higher than a threshold voltage sufficient to incline the liquid crystal molecule with respect to the substrate. As a result, the alignment of the liquid crystal molecule when the voltage is not applied thereto is inclined with respect to the substrate so as to change the double refraction property of a crystal layer. In this way, the liquid crystal color display cell utilizing the ECB effect functions to effect the color display by means of two polarization plates crossed perpendicularly with each other.

The liquid color display cell utilizing the ECB effect has a number of disadvantages. In the first place, the threshold voltage is so high that the operating voltage becomes high. Secondly, a range of the applied voltage within which the color changes yell→orange→red→purple→blue in response to the degree of inclination of the liquid crystal molecule is very narrow, so that a slight voltage change causes the color phase to change. Thirdly, the visual angle is extremely narrow and hence it is necessary to use a projector type cell, thereby significantly restricting application fields. Finally, if the two substrates are not uniform in thickness, such non-uniform thickness of the substrates results in an unevenness of the display color, so that in order to provide a cell which can precisely effect the color display, its manufacture becomes difficult.

As described above, the liquid crystal color display cell utilizing the ECB effect has the number of disadvantages, so that at present such cell is not used as an efficient liquid crystal color display cell. In the liquid crystal color display cell utilizing the Guest-host effect, if a very small amount of a dichroic coloring agent having a bar-shaped molecular structure and constituting a "guest" is added to a nematic liquid crystal for constituting a host, the liquid crystal molecule becomes changed in orientation in response to a voltage applied to the liquid crystal so as to cause the guest molecule to change its orientation, thereby making the attraction properties of the liquid crystal molecules different from each other. This difference between attraction properties of the liquid crystal molecules is utilized to effect the color display.

The liquid crystal color display cell utilizing the Guest-host effect has the advantages that the visual angle is made larger and the transmittivity is made higher than those of the other liquid crystal color display cell, and that the color phase and coloring degree can be adjusted at will by suitably selecting the guest.

As described above, the dichroic coloring agent to be added as the guest of the Guest-host effect has the bar-shaped structure. In general, the coloring agent having the bar-shaped structure has a feature that if the direction of the long axis of the molecule thereof coincides with the direction of an electric field vector of an incident light, a light absorbing power of the coloring agent becomes maximum and the transmittivity becomes minimum and that if the direction of the long axis of the molecule thereof becomes perpendicular to the direction of the electric field vector of the incident light, the color absorbing power of the coloring agent becomes minimum and the transmittivity becomes maximum. As a result, in the liquid crystal color display cell utilizing the Guest-host effect, in order to change the color absorbing power of the coloring agent as large as possible, provision may be made of the following two liquid crystal color display cells.

In the former cell, between two substrates which are treated such that the liquid crystal molecules are homogeneously aligned is sandwiched a liquid crystal including a "host" formed of a liquid crystal having a positive electric anisotropic property and added with a very small amount of a guest and to the liquid crystal is applied a voltage so as to align the liquid crystal molecule perpendicular to the substrate plane.

In the latter cell, between two substrates which are treated such that the liquid crystal molecules are homeotropically aligned is sandwiched a liquid crystal including a host formed of a liquid crystal having a negative dielectric anisotropic property and added with a very small amount of guest and to the liquid crystal is applied a voltage so as to orient the liquid crystal molecule horizontally with respect to the substrate plane.

The former liquid crystal color display cell can change over the color display from a color display to a colorless display in response to the voltage applied thereto, while the latter liquid crystal color display cell can change over the color display from the colorless display to the color display in response to the voltage applied thereto. As a result, the latter liquid crystal color display cell utilizing the Guest-host effect provides a display part which can exhibit a color phase of a dichroic coloring agent for changing over the color display from the colorless display to the color display in response to the voltage applied thereto and hence is more suitable as the display system than the former cell. In the liquid crystal color display cell utilizing the Guest-host effect and comprising two substrates which are pretreated such that the liquid crystal molecules are homeotropically aligned, if the homeotropical aligning treatment causes the liquid crystal molecule to incline at an angle within a range between an angle smaller than 90° and an angle of several degrees to a normal line drawn perpendicular to the substrate plane and if this direction of inclination is not aligned with one direction, the liquid crystal molecules are inclined in different directions in the case of changing the orientation of liquid crystal molecules into the horizontal direction to the substrate plane in response to the voltage applied thereto as shown in FIG. 1, thereby deteriorating contrast and inducing unevenness in color.

In a liquid crystal color display cell which can eliminate the above mentioned drawback by orienting the liquid crystal molecules from the condition shown in FIG. 2 in which the liquid crystal molecules are aligned in one direction and inclined at an angle of substantially right angles to the substrate plane to the condition shown in FIG. 3 in which the liquid crystal molecules are aligned in one direction and alinged with a horizontal direction between the substrates by applying the voltage thereto, the liquid crystal molecules are aligned with one direction and also aligned with one horizontal direction between the substrates in the case of applying the voltage thereto, so that the maximum absorption is effected to only the incident light whose electric field vector coincides with the long axis direction of the guest molecule added to the liquid crystal.

That is, in FIG. 4, the maximum absorption is effected for an incident light 5 whose electric field vector is perpendicular to an X axis, and as a result, in the case of viewing the liquid crystal color display cell from directions other than the direction of the incident light 5, the maximum absorption is not obtained and the absorption factor becomes changed in dependence with the angle of viewing the cell. As a result, the liquid crystal color display cell utilizing the Guest-host effect has the advantage that the visual angle is wider than that of the other liquid crystal color display cell, but has the disadvantage that the cell could not be viewed with the same color strength irrespective of the view angles.

In addition, the conventional liquid crystal color display cell utilizing the Guest-host effect can effect the color display, but the change in the color degree is restricted to the single color phase only, so that the multi-colors display effected by the liquid crystal color display device utilizing the ECB effect could not be obtained. That is, the liquid crystal color display cell utilizing the Guest-host effect and comprising the two substrates treated to be homeotropically aligned functions to change the color display from the colorless display to the color display in response to the voltage applied thereto and is adapted to the display system. In this cell, the color degree change of the single color is called as the color display, but does not means the color display of different color phases.

SUMMARY OF THE INVENTION

A main object of the invention, therefore, is to provide a liquid crystal color display cell which can eliminate the above mentioned drawbacks which have been encountered with the conventional liquid crystal color display cell.

Another object of the invention is to provide a liquid crystal color display cell having an excellent visual field angle property.

A further object of the invention is to provide a liquid crystal color display cell having a good contrast.

A still further object of the invention is to provide a liquid crystal color display cell which can effect color display inclusive of at least two colors and completely different in color phase.

In order to attain the above mentioned objects, a feature of the invention is the provision of a liquid crystal color display cell utilizing a Guest-host effect which can determine orientation of the liquid crystal molecules. Another feature of the invention is the provision of a liquid crystal color display cell which can orient the liquid crystal molecules when the voltage is not applied thereto for the purpose of effectively utilizing the most of a light absorption anisotropic property of a dichroic coloring agent added to the liquid crystal. A further feature of the invention is the provision of a liquid crystal color display cell comprising a pair of transparent electrode substrates, a color reflecting plate opposed to the display side of the substrates, and at least one kind of dichroic coloring agent to be added to a liquid crystal, whereby at least two color displays completely different in color phase are effected.

BRIEF DESCRIPTION OF THE DRAWING

FIG. 1 is a schematic diagram showing host and guest molecules of a conventional liquid crystal color diplay cell, the host and guest molecules being oriented in different directions in response to a voltage applied thereto;

FIG. 2 is a schematic diagram showing the host and guest molecules shown in FIG. 1 and oriented in one direction when the voltage is not applied thereto;

FIG. 3 is a schematic diagram showing the host and guest molecules shown in FIG. 1 and oriented in another direction when the voltage is applied thereto;

FIG. 4 is a perspective view showing the molecule alignment shown in FIG. 3 in three dimensional manner;

FIG. 5 is a cross sectional view showing a twist nematic type liquid crystal color cell according to the invention;

FIG. 6 is a perspective view showing the molecule alignment having a construction twisted by 90° between the substrates of the liquid crystal color display cell according to the invention when the voltage is not applied thereto;

FIG. 7 is a perspective view showing the molecule orientation shown in FIG. 6 when the voltage is applied;

FIG. 8 is a plan view showing the molecule orientation shown in FIG. 7;

FIG. 9 is a cross sectional view showing another embodiment of a liquid crystal color display cell according to the invention;

FIG. 10 is a cross sectional view showing the host and guest molecule orientation of the cell shown in FIG. 9 when the voltage is not applied thereto; and FIG. 11 is a cross sectional view showing the host and guest molecule orientation of the cell shown in FIG. 9 when the voltage is applied.

DETAILED DESCRIPTION OF THE PREFERRED EMBODIMENT

In FIG. 5 is shown an embodiment of a twist nematic type liquid crystal color display cell according to the invention. Referring to FIG. 5, reference numerals 1 and 2 designate a pair of glass substrates shown in FIGS. 1 to 4. The glass substrates are provided at respective inside surfaces with transparent electrodes 21, 23, respectively. Between the transparent electrodes 21, 23 is hermetically sealed a liquid crystal layer 16 composed of liquid crystal molecules 3 and guest molecules 4 shown in FIGS. 1 to 4. The lower glass substrate 2 is provided at its lower surface with a reflecting plate 17.

A method of orienting the liquid crystal molecule according to the invention will now be described with reference to FIGS. 6 to 8.

As shown in FIG. 6, the liquid crystal molecules 3 are inclined at an angle 8 from an angle smaller than 90° to 60° with respect to the two opposed substrates 1, 2 and aligned in one direction by an orienting treatment. These liquid crystal molecules 3 are oriented to be twisted by 90° one from the other to form a twisted construction.

If a voltage higher than a threshold voltage is applied between the substrates between which the molecules are oriented as above described, the liquid crystal moleclue 3 is continuously rotated by 90° to take a horizontal alignment between the substrates. As a result, a guest molecule 4 which is a dichroic coloring agent is also continuously rotated by 90° together with the liquid crystal molecule 3 to take a horizontal alignment between the substrates.

In FIG. 8 is shown the substrate shown in FIG. 7 viewed two dimensionally in a Z-axis direction. In FIG. 8, the electric field vector of incident lights 6,7 existing in a plane inclusive of an X axis and a Y axis and between these two axes coincides with the long axis direction of the guest molecule 4 so as to exhibit the maxium absorption. That is, the guest molecule 4 on the upper substrate plane is parallel with the Y axis, while a twisted direction 9 causes molecules 4' on the lower substrate plane to make parallel with the X axis.

As a result, the conventional liquid crystal color display device utilizing the Guest-host effect exhibits the maximum absorption to the incident light 5 directed in one direction only, while the method of determining the molecule orientation is capable of exhibiting the maximum absorption to the incident lights directed in two dimensional 180° directions.

The use of measures according to the invention that the liquid molecules are inclined at an angle within a range from an angle smaller than 90° to an angle of 60° with respect to opposed two substrates and aligned in one inclined direction by the orienting treatment and also aligned to have the 90° twisted construction provides a liquid crystal color display cell which can make the best use of the advantage of the conventional liquid crystal color display cell utilizing the Guest-host effect that the visual angle is wide, that the transmittivity is high, and that any adjustment in the color phase and coloring degree can be effected by selecting the guest molecule, and which can improve the visual field property and contrast.

As described above, the liquid crystal color display cell utilizing the Guest-host effect and having the 90° twisted construction between the two opposed substrates can exhibit the maximum absorption for the incident lights directed two dimensional 180° directions. Use may be made of a 180° twisted construction between the two opposed substrates for the purpose of exhibiting the maximum absorption for incident lights directed two dimensional 360° directions. Such 180° twisted construction could not be obtained by adding a small amount of dichroic dyestuff, that is, the guest to the liquid crystal molecule, that is, the host molecule. But, the 180° twisted construction can be obtained by further adding a small amount of a material having a right or left directional property to the above mentioned guest and host molecules. The use of the 180° twisted construction provides a liquid crystal color display cell utilizing the Guest-host effect which can effect the color display which is the same in color and coloring degree viewed in all directions and which can significantly improve contrast and visual field characteristic.

The term liquid crystal molecule shall be understood to mean a liquid crystal molecule in a liquid crystal color display cell utilizing Guest-host effect and to include both a liquid crystal molecule composed of a host and a dichroic coloring agent molecule compound of a guest.

As described above, if the liquid crystal molecule is inclined at an angle of several degrees instead of 90° with respect to the normal line drawn perpendicular to the substrate plane and if its inclined directions are not aligned with one direction, the liquid crystal molecules become rotated in different directions instead of one direction, thereby degrading the contrast, inducing color unevenness or the like.

The liquid crystal molecule may be inclined at an angle of larger than several degrees with respect to the normal line drawn perpendicular to the substrate plane. This inclined angle is determined by the coloring degree of the guest, that is, the dichroic coloring agent. In the case of using the dichroic coloring agent now available in market, it is preferable to incline the liquid crystal molecule at an angle within a range between an angle smaller than 90° and an angle of 60°. This inclined angle may be enlarged to a range between an angle smaller than 90° and an angle of 45° at the sacrifice of somewhat degrading the contrast of the liquid crystal color display cell.

Another embodiment of a liquid crystal color display cell according to the invention will now be described with reference to FIGS. 9 to 11. A liquid crystal color cell according to the invention shown in FIG. 9 comprises a pair of opposed transparent substrates 11, 12, transparent electrodes 21, 22 disposed on respective inside surfaces of the substrates, vertically orienting layers 31, 32 disposed on respective inside surfaces of the electrodes, a liquid crystal layer 16 hermetically sandwiched between the vertically orienting layers and composed of a liquid crystal having a negative dielectric anisotropic property and at least one kind of dichroic coloring agent, a colored reflecting plate 15 disposed on that side of the substrate 12 which is opposed to the display side, and a polarization plate 14 interposed between the colored reflecting plate 15 and the substrate 12. The present embodiment is characterized by the provision of the colored reflecting plate 15 which is not used in the conventional liquid crystal color display cell utilizing the Guest-host effect. The use of a combination of the colored reflecting plate 15 and at least one kind of dichroic coloring agent added to the liquid crystal ensures at least two color displays which are completely different in color phase.

It has already been well known that a mixture of at least two colors which are different in color phase results in a new color whose phase is different from those of the colors to be mixed.

In color science, a mixed color is mainly divided into an addition mixed color and a subtraction mixed color. Red, green and blue purple are the three primary colors of the addition mixed color or three primary colors of color light. It is impossible to prepare blue purple color from a mixed color composed of red and green and to prepare a red color from a mixed color composed of green and blue purple. These three primary colors are independent from each other and can be used to prepare almost all colors. If these three primary colors are mixed at the same time and if these three colors are the same in light strength, a white color is produced.

In the subtraction mixed color, red purple, yellow and blue green are the three primary colors of the subtraction mixed color. Similar to the above mentioned addition mixed color, the three primary colors of the subtraction mixed color are independent from each other and can be used to prepare almost all colors. If these three primary colors are mixed at the same time and in the same amount, a mixed color thus obtained becomes colorless grey or black. The theory of such subtraction mixed color has been well known in oil or water picture paints and is applicable to color prints or color dyestuff solution.

The liquid crystal color display cell according to the invention makes use of the above mentioned subtraction mixed color theory and can improve the conventional liquid crystal display call utilizing the Guest-host effect and exhibiting the monochromatic display so as to enable the dichroic display whose color phases are different from each other.

In FIG. 10 are shown orientations of host molecules 17 and guest molecules 18 of a liquid crystal color display cell according to the invention when the voltage is not applied to the substrates 11, 12. As described above, the electric field vector of an incident light becomes perpendicular to the long axis direction of the guest molecule and hence the transmittivity becomes maximum. As a result, even though the liquid crystal layer is colorless, the incident light passed through the liquid crystal layer is reflected by the colored reflecting plate 15. When the incident light is reflected by the colored reflecting plate 15, the incident light is subjected to selective absorption of any wave length inherent in the colored reflecting plate 15. As a result, the reflected light exhibits color of the colored reflecting plate 15 and displays the color of the colored reflecting plate when the voltage is not applied to the substrates 11, 12.

In FIG. 11 is shown orientation of the host molecules 17 and guest molecules 18 when the voltage is applied to the substrates 11, 12 of the liquid crystal color display cell according to the invention. The voltage applied to the substrates 11, 12 causes the host molecules 17 to horizontally align with the substrates 11, 12 and hence the guest molecules 18 are also horizontally aligned with the substrates 11, 12. As a result, the electric field vector of the incident light coincides with the long axis direction of the guest molecules 18 thus rendering the absorption maximum. The incident light passed through the liquid crystal layer exhibits the color of the guest molecules 18 added to the host molecules 17. The presence of the colored reflecting plate 15, however, causes the incident light, which has been selectively absorbed by the guest molecules 18, to selectively absorb the incident light again. The incident light is reflected by the colored reflecting plate 15 and hence the display part displays a mixed color composed of the color of the guest molecules 18 and the color of the colored reflecting plate 15.

The liquid crystal color display cell according to the invention will now be described with reference to practical examples. The liquid crystal, that is, the host molecule, may be formed of a mixture of 60 mol % of MBBA,

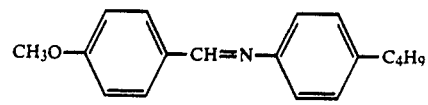

and 50 mol% of EBBA,

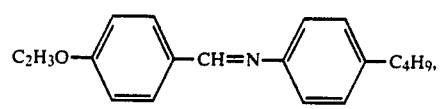

while the guest molecule may be formed of a blue dyestuff having a constitutional formula given by

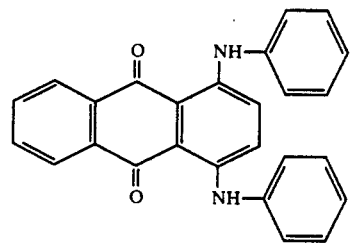

1.00 wt% of the blue dyestuff is added to the above mentioned host molecule to prepare the liquid crystal layer 16. The colored reflecting plate 15 is selected as yellow in color. The substrates provided with respective transparent electrodes are subjected to the orienting treatment. Thus, the liquid crystal color display cell constructed according to the invention and shown in FIG. 9 is completed. The liquid crystal color display cell constructed as above described functions to display yellow corresponding to the color of the colored reflecting plate when the voltage is not applied to the substrates and functions to display green which is a mixed color composed of blue of the guest molecules and yellow of the colored reflecting plate.

Examples of the other dichroic coloring agent are as follows.

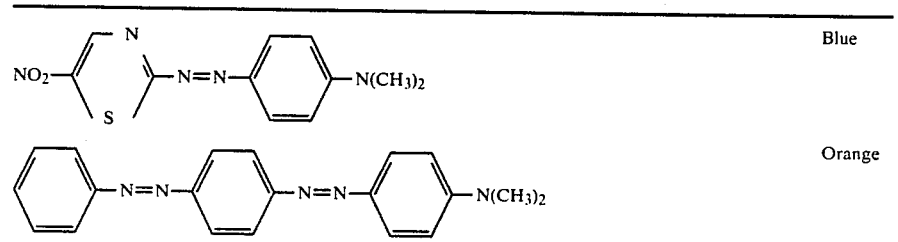

-continued

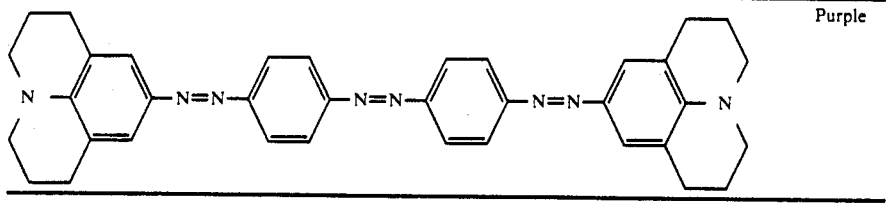
Purple

In the above mentioned embodiment, the liquid crystal layer is vertically oriented and is special one among twisted structure wherein a twisted structure is absent.

As stated hereinbefore, the conventional liquid crystal color display cell utilizing the Guest-host effect functions to effect the monochromatic dispaly. On the contrary, the liquid crystal color display cell utilizing the Guest-host effect according to the invention is capable of displaying at least two colors whose color phases are different from each other, capable of displaying any desired color by making the best use of the conventional Guest host effect and by combining the color of the colored reflecting plate with the color of the guest molecules, and capable of changing over colors to colorless by combining the color of the colored reflecting plate with the complementary color of the guest molecules.

What is claimed is:

1. A liquid crystal device comprising:
   (a) a pair of upper and lower opposed substrates with a space therebetween, each formed of a glass plate;
   (b) transparent electrodes each disposed on the inside surface of each of said substrates;
   (c) a negative dielectric anisotropic nematic liquid crystal layer disposed between said substrates and containing a dichroic coloring agent and a chiral material having a left or right directional property;
   (d) each surface of said substrates treated such that liquid crystal molecules of said liquid crystal layer are oriented at an angle within a range of between 60° and 90° with respect to each said surface of said substrates; and
   (e) a twist angle formed between an inclination direction of said liquid crystal molecules adjacent to said upper substrate and said liquid crystal molecules adjacent to said lower substrate such that said liquid crystal layer has twisted-like structure in the presence and absence of an applied electric field, the twist angle being substantially 180°, the 180° twist angle being obtained by said chiral material having a left or right directional property.

2. The liquid crystal device according to claim 1 wherein said twisted-like structure of said liquid crystal layer between said substrate is formed of liquid crystal molecules with said twist angle of 90°.

3. The cell according to claim 1 wherein said cell further comprises a reflection plate mounted at the outside of said lower substrate.

4. A liquid crystal color display cell comprising:
   a pair of upper and lower opposed substrates each formed of a glass plate;
   (b) transparent electrodes each disposed on the inside surface of each of said substrates;
   (c) a liquid crystal layer hermetically sealed between said substrates each provided with said transparent electrode and subjected to a vertically orienting treatment;
   (d) a polarization plate disposed on the outside surface of said lower glass substrate;
   (e) a reflecting plate disposed on the outside of said polarization plate;
   (f) a negative dielectric anisotropic nematic liquid crystal layer disposed between said substrates and containing a dichroic coloring agent and a small amount of chiral material having a left or right directional property;
   (g) each surface of said substrates treated such that liquid crystal molecules of said liquid crystal layer are oriented at an angle within a range of between 60° and 90° with respect to each said surface of said substrates; and
   (h) a twist angle formed between an inclination direction of said liquid crystal molecules adjacent to said upper substrate and said liquid crystal molecules adjacent to said lower substrate, and said liquid crystal layer has a twisted-like structure in the presence and absence of an applied electric field, the twist angle being substantially 180°, the 180° twist angle being obtained by said chiral material having a left or right directional property.

5. The cell according to claims 3 or 4 wherein said reflecting plate has a desired color for the purpose of optically combining the desired color with colors transmitted by the liquid crystal layer.

* * * * *